(12) United States Patent
Halm et al.

(10) Patent No.: US 12,553,586 B2
(45) Date of Patent: Feb. 17, 2026

(54) LIGHTING DEVICE FOR THE EXTERIOR OF A MOTOR VEHICLE HAVING A PROFILE FOR RETAINING A LIGHT GUIDE

(71) Applicant: Bayerische Motoren Werke Aktiengesellschaft, Munich (DE)

(72) Inventors: Markus Halm, Baldham (DE); Fabio Leone, Tolmezzo (IT)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 18/559,590

(22) PCT Filed: Jun. 13, 2022

(86) PCT No.: PCT/EP2022/066034
§ 371 (c)(1),
(2) Date: Nov. 8, 2023

(87) PCT Pub. No.: WO2023/280523
PCT Pub. Date: Jan. 12, 2023

(65) Prior Publication Data
US 2024/0271772 A1    Aug. 15, 2024

(30) Foreign Application Priority Data
Jul. 8, 2021    (DE) .................... 10 2021 117 619.0

(51) Int. Cl.
*F21S 43/27*    (2018.01)
*F21S 43/237*    (2018.01)
(Continued)

(52) U.S. Cl.
CPC ............. *F21S 43/27* (2018.01); *F21S 43/237* (2018.01); *F21S 43/245* (2018.01); *F21W 2103/35* (2018.01)

(58) Field of Classification Search
CPC ......... H01S 5/02251; B60Q 3/54; B60Q 3/56; B60Q 3/62; B60Q 3/64; B60Q 1/263;
(Continued)

(56) References Cited

U.S. PATENT DOCUMENTS 4,977,487 A      12/1990  Okano
5,688,569 A  *  11/1997  Gilmore ............... A47B 95/043
                                                            428/167
(Continued)

FOREIGN PATENT DOCUMENTS

DE            298 07 774 U1    7/1998
DE      10 2015 103 850 A1     9/2016
(Continued)

OTHER PUBLICATIONS

Machine translation of DE102017100754A, retrieved from worldwide.espacenet.com on Sep. 17, 2024 (Year: 2024).*
(Continued)

*Primary Examiner* — Abdulmajeed Aziz
*Assistant Examiner* — Steven Y Horikoshi
(74) *Attorney, Agent, or Firm* — Crowell & Moring LLP

(57) ABSTRACT

A lighting device includes a housing with a translucent cover panel and one or more flexible light guides arranged at least partly in the housing. Each light guide contains one or more fibers which extend between two ends of the respective light guide. A lighting apparatus for supplying light is provided at one end of each light guide, and the supplied light produces light emission out of the respective light guide. At least one part of the emitted light exits the lighting device via the cover panel. A specified section of the respective light guide is held in a support in the interior of the housing by a profiled section having a translucent receiving section in which the specified section is received and fixed. The lighting device also includes a securing section which extends from the
(Continued)

receiving section into a depression of the support and is fixed in the depression.

19 Claims, 4 Drawing Sheets

(51) Int. Cl.
*F21S 43/245* (2018.01)
*F21W 103/35* (2018.01)

(58) Field of Classification Search
CPC ........ F21S 43/247; F21S 41/24; F21S 43/235; F21S 43/236; F21S 43/237; F21S 43/251; F21S 43/27; F21V 2200/10; F21V 2200/15
See application file for complete search history.

(56) References Cited

U.S. PATENT DOCUMENTS

| | | | | |
|---|---|---|---|---|
| 6,450,678 | B1* | 9/2002 | Bayersdorfer | B60Q 3/51 |
| | | | | 362/581 |
| 10,697,606 | B1* | 6/2020 | Fredricks | F21S 41/148 |
| 2002/0054494 | A1* | 5/2002 | Ishiharada | B60K 35/60 |
| | | | | 362/495 |
| 2002/0131273 | A1 | 9/2002 | Tufte | |
| 2007/0032319 | A1* | 2/2007 | Tufte | G09F 13/22 |
| | | | | 473/570 |
| 2012/0069592 | A1 | 3/2012 | Natsume et al. | |
| 2013/0148373 | A1* | 6/2013 | Bayersdorfer | G02B 6/001 |
| | | | | 362/511 |
| 2014/0313722 | A1* | 10/2014 | Eloff | F21S 4/22 |
| | | | | 362/418 |
| 2016/0377783 | A1* | 12/2016 | Tanahashi | F21S 8/04 |
| | | | | 362/581 |
| 2017/0350571 | A1 | 12/2017 | Gold et al. | |
| 2020/0110210 | A1 | 4/2020 | Beauchamp | |
| 2020/0256535 | A1* | 8/2020 | Kizaki | F21S 43/237 |
| 2021/0181405 | A1* | 6/2021 | Nichol | G02B 6/0016 |
| 2021/0188158 | A1* | 6/2021 | Monti | B60Q 1/1423 |
| 2023/0103138 | A1* | 3/2023 | Sakino | F21S 41/255 |
| | | | | 362/511 |

FOREIGN PATENT DOCUMENTS

| | | | |
|---|---|---|---|
| DE | 10 2016 210 363 A1 | 12/2017 | |
| DE | 102017100754 A1 * | 7/2018 | ............ F21S 43/245 |
| DE | 10 2020 102 602 A1 | 8/2021 | |
| FR | 3 053 440 A1 | 1/2018 | |
| WO | WO-2007047304 A1 * | 4/2007 | ............... B60Q 3/51 |
| WO | WO 2013/030040 A1 | 3/2013 | |

OTHER PUBLICATIONS

Machine translation of Gebauer DE 10 2017 100754 A1, retrieved from worldwide.espacenet.com on Sep. 17, 2024 (Year: 2024).*
International Search Report (PCT/ISA/210) issued in PCT Application No. PCT/EP2022/066034 dated Sep. 5, 2022 with English translation (6 pages).
German-language Written Opinion (PCT/ISA/237) issued in PCT Application No. PCT/EP2022/066034 dated Sep. 5, 2022 with English translation (9 pages).
German-language Search Report issued in German Application No. 10 2021 117 619.0 dated Apr. 29, 2022 with partial English translation (12 pages).

* cited by examiner

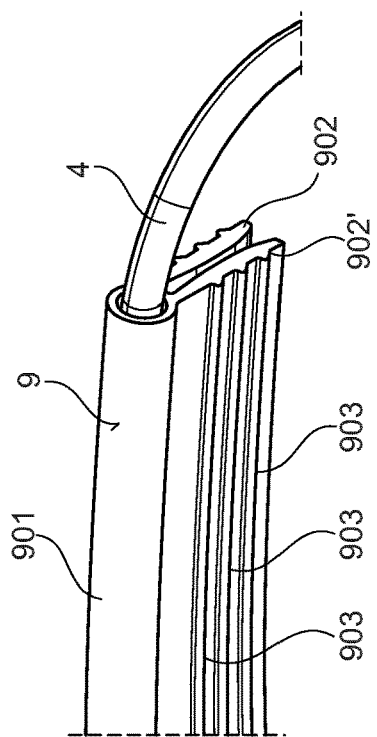
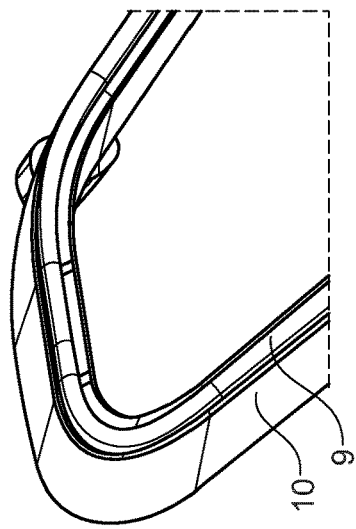
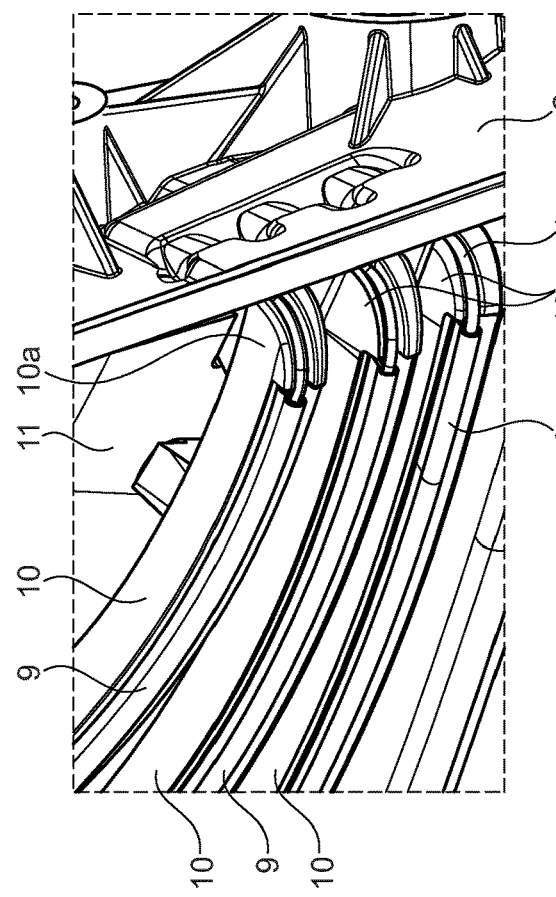

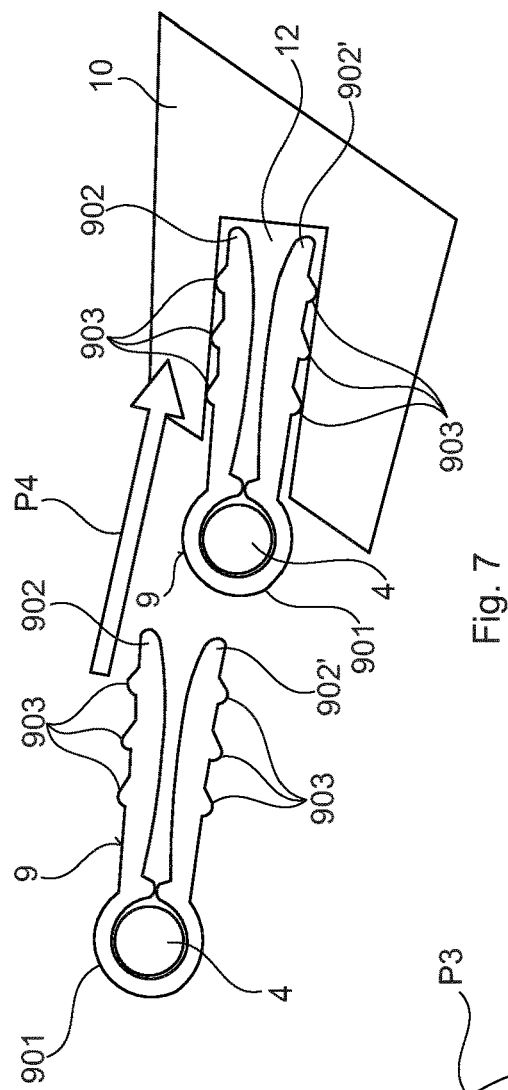
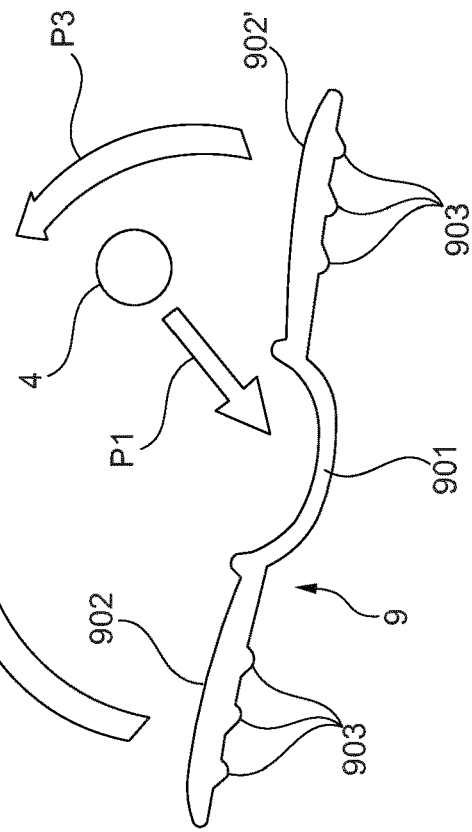
Fig. 7
Fig. 6

LIGHTING DEVICE FOR THE EXTERIOR OF A MOTOR VEHICLE HAVING A PROFILE FOR RETAINING A LIGHT GUIDE

BACKGROUND AND SUMMARY

The invention relates to a lighting device for the exterior of a motor vehicle.

Various technologies for implementing lighting functions in external lamps of a motor vehicle are known from the prior art. Among other things, use is made of flexible light guides of fibers, into which light guides the light from a light source is input coupled and as a result the light guide is illuminated.

Document DE 10 2016 210 363 B1 discloses a lighting device for a motor vehicle comprising a laser light source and a fibrous light guiding element. The lighting device may be used for example as a vehicle rear lamp.

Document WO 2013/030040 A1 describes a vehicle fixture comprising a light guide which is connected to a groove by a form fit, by an integral bond and/or in clamping fashion. To retain the light guide in the groove, the latter is specially shaped with a bevel and/or a projection which engage(s) in an undercut of the groove.

It is an object of the invention to provide a lighting device for an exterior of a motor vehicle, in which lighting device one or more flexible light guides are fastened inside the housing of the lighting device in straightforward fashion.

This object is achieved by the lighting device according to the claimed invention.

The lighting device according to embodiments of the invention serves to create a light distribution in the exterior space of the motor vehicle, that is to say in the external surroundings of the motor vehicle. The lighting device is therefore a motor vehicle external lamp. The motor vehicle may for example be an automobile and possibly also a truck. If interactions between the lighting device and components of the vehicle are described in the following text and in particular in the patent claims, this should always be understood to mean that the interaction occurs when the lighting device is arranged or installed in the motor vehicle. The components of the lighting device that correspondingly interact with the motor vehicle or components of the motor vehicle are therefore designed such that the interaction is brought about when the lighting device is arranged or installed in the motor vehicle.

The lighting device according to embodiments of the invention comprises a housing with a light-permeable covering lens. Preferably, the covering lens has a transmittance of 50% or more and in particular 90% or more and particularly preferably 95% or more. Depending on the configuration, the covering lens can be colored (for example in red) or uncolored. However, it is always ensured that light from the interior of the housing of the lighting device can pass outward through the covering lens. Here and in the following text, light should be understood to mean electromagnetic radiation in a wavelength which is visible to the human eye.

The lighting device comprises one or more flexible light guides, each of which is arranged at least partially in the housing, wherein a respective light guide contains one or more fibers which extend between two ends of the respective light guide in its longitudinal direction. Furthermore, a lighting apparatus for feeding in light at one end of the respective light guide is provided in the lighting device according to embodiments of the invention, wherein the light that is fed in causes light to radiate out of the respective light guide along its longitudinal direction. In other words, light that is fed in is output coupled out of the respective light guide continuously along its length, wherein the light preferably exits the respective light guide along the entire circumference. The respective light guide thus appears as a luminous element. At least part of the light radiation from a respective light guide exits the lighting device through the covering lens, that is to say this light enters the exterior space, or the surroundings, of the motor vehicle. Preferably, red light is fed into the one or more light guides by the lighting apparatus. Here and in the following text, red light is to be understood to mean light with a wavelength in the range between 620 nm and 780 nm.

The lighting device according to embodiments of the invention is distinguished in that a specific portion of the respective light guide is held inside the housing in a carrier by a profile, wherein the profile has a light-permeable receiving portion, in which the specific portion is received and fixed, and a fastening portion, which extends from the receiving portion into a depression in the carrier and is fixed there, and which preferably likewise is light-permeable. Optionally, it is also possible to provide multiple specific portions correspondingly fastened in the carrier via a profile. There is therefore a corresponding profile for each specific portion of the one or more light guides. The light guides may be fastened in separate carriers via the profile. Optionally, it is also possible to provide a shared carrier for all the light guides.

In addition to the one or more light guides just described, the lighting device according to embodiments of the invention may optionally also comprise one or more further light guides which are fastened in the housing in another way (i.e. not via a profile). In a preferred variant, however, all the light guides fitted in the lighting device are retained via a corresponding profile according to the features described above.

The lighting device according to embodiments of the invention has the advantage that a flexible light guide can be fastened in the interior of the lighting device via a profile in straightforward fashion, it being ensured at the same time that the profile does not obscure the light radiation from the light guide owing to the light permeability of the receiving portion. Depending on the configuration, the light-permeable receiving portion and optionally also the fastening portion may have different transmittances. Preferably, the transmittance is 50% or more and in particular 90% or more. The light-permeable receiving portion is preferably not colored, this optionally also applying to the fastening portion.

In a particularly preferred embodiment, the specific portion which holds the respective light guide in the interior of the housing contains a region of the respective light guide which is visible through the covering lens when the lighting apparatus is turned on and possibly also when it is turned off. In other words, a region of the light guide that, when the lighting apparatus is activated, appears to be a luminous portion of the light guide for an external viewer is received in the profile. With this embodiment, an attractive design can be achieved in that the light guide is perceived as a freely floating luminous element behind the covering lens of the lighting device.

The one or more light guides used in the lighting device according to embodiments of the invention may have different configurations. Preferably, a respective light guide has a round cross section, which in particular has a diameter between 0.05 mm and 5 mm and particularly preferably between 0.1 mm and 3 mm. The fiber or the fibers in a respective light guide are preferably glass fibers. Preferably, a respective light guide is formed from a plurality of fibers. In particular, a respective light guide comprises 1 to 200 and preferably 10 to 200 fibers.

In a particularly preferred embodiment, the respective light guide is clamped in the receiving portion of the profile. As an alternative or in addition, the light guide may also be latched and/or adhesively bonded in the receiving portion. This ensures good fixing of the light guide in the receiving portion.

In a particularly preferred embodiment, the profile is a one-piece profile, which simplifies its manufacture. Preferably, the entire profile is made from the same material. In a further, preferred variant, the profile is made from plastic. In this case, the profile is preferably an extruded component. In a particularly preferred embodiment, the plastic comprises PMMA (PMMA=polymethyl methacrylate).

In a further, particularly preferred embodiment of the lighting device according to the invention, the receiving portion of the profile and preferably the entire profile is made from resilient material. Preferably, this material can be bent such that it enables a minimum bending radius of the specific portion of 100 mm or less, in particular 10 mm or less and particularly preferably 6 mm or less. Such a resilient profile ensures straightforward and flexible fastening of the light guide in the corresponding carrier. In particular, what is also enabled is that the specific portion is guided in the profile in at least partially curved fashion, as a result of which an attractive shaping of the light guide fitted in the lighting device can be achieved. In the case of the curved guidance of the specific portion, the profile of the corresponding depression is also curved along the carrier.

In a further, preferred variant, the receiving portion of the profile is a portion of the resilient material which is bent around at least part of the circumference of the respective light guide. In this way, straightforward fixing of the light guide in the receiving portion by way of a force fit or form fit can be achieved.

In a further, preferred variant, the fastening portion of the profile is clamped in the depression in the carrier. As an alternative or in addition, the fastening portion may also be latched and/or adhesively bonded in the depression.

In a further, preferred configuration, the profile as fastening portion comprises two flanges which bear against one another, extend into the depression in the carrier at least in certain portions, and preferably have a continuous form along the longitudinal direction of the respective light guide in the specific portion, wherein the receiving portion connects the flanges to one another. This variant enables straightforward installation of the profile in the corresponding carrier.

In a further variant, the fastening portion of the profile comprises one or more projections, which make contact with an inner wall of the depression in the carrier. Preferably, these projections cause the fastening portion to be latched in the depression. As an alternative or in addition, the fastening portion may also be clamped and/or adhesively bonded in the depression in the region of the projections. The projections may for example be in the form of ribs and/or teeth. If the fastening portion contains the flanges described above, the corresponding projections are formed on those outer sides of the flanges that face away from one another or optionally also only on one of these outer sides.

In a further, preferred configuration, the lighting apparatus comprises one or more LEDs and/or one or more laser light sources (preferably one or more laser diodes), which are preferably intended to feed red light into the one or more light guides. Preferably, a separate LED or laser light source is provided for each light guide. The use of LEDs or laser light sources makes it possible to ensure a very compact structure of the lighting device. It is also possible to achieve very high illumination densities with laser light sources.

In a further, preferred configuration, the carrier is arranged on an opaque stop, wherein the lighting apparatus for feeding light into the end of the light guide or the light guides is located behind the stop. This ensures that the lighting apparatus is not visible through the covering lens.

The lighting device according to embodiments of the invention can be provided for different intended uses on the motor vehicle. Preferably, the lighting device is a rear lamp. In particular, the light guide or the light guides form at least part of the taillight of the rear lamp. The taillight is distinguished in that it is continuously on—by contrast to the brake light and the direction indicator—when it is activated while the vehicle is traveling.

In addition to the lighting device described above, the invention relates to a motor vehicle comprising one or more lighting devices according to embodiments of the invention.

One exemplary embodiment of the invention will be described in detail below with reference to the appended figures.

BRIEF DESCRIPTION OF THE DRAWINGS

FIG. 3 show a perspective view of a detail of the rear lamp from FIG. 1 and FIG. 2.

FIG. 4 shows a perspective view of a detail depicting the guidance of the light guide in a profile.

FIG. 5 shows a perspective view of a detail depicting a curved portion of the light guide in the rear lamp from FIG. 1 and FIG. 2.

FIG. 6 and FIG. 7 show sectional views depicting the installation of the light guide in the lighting device using the profile.

DETAILED DESCRIPTION OF THE DRAWINGS

Figure 1:
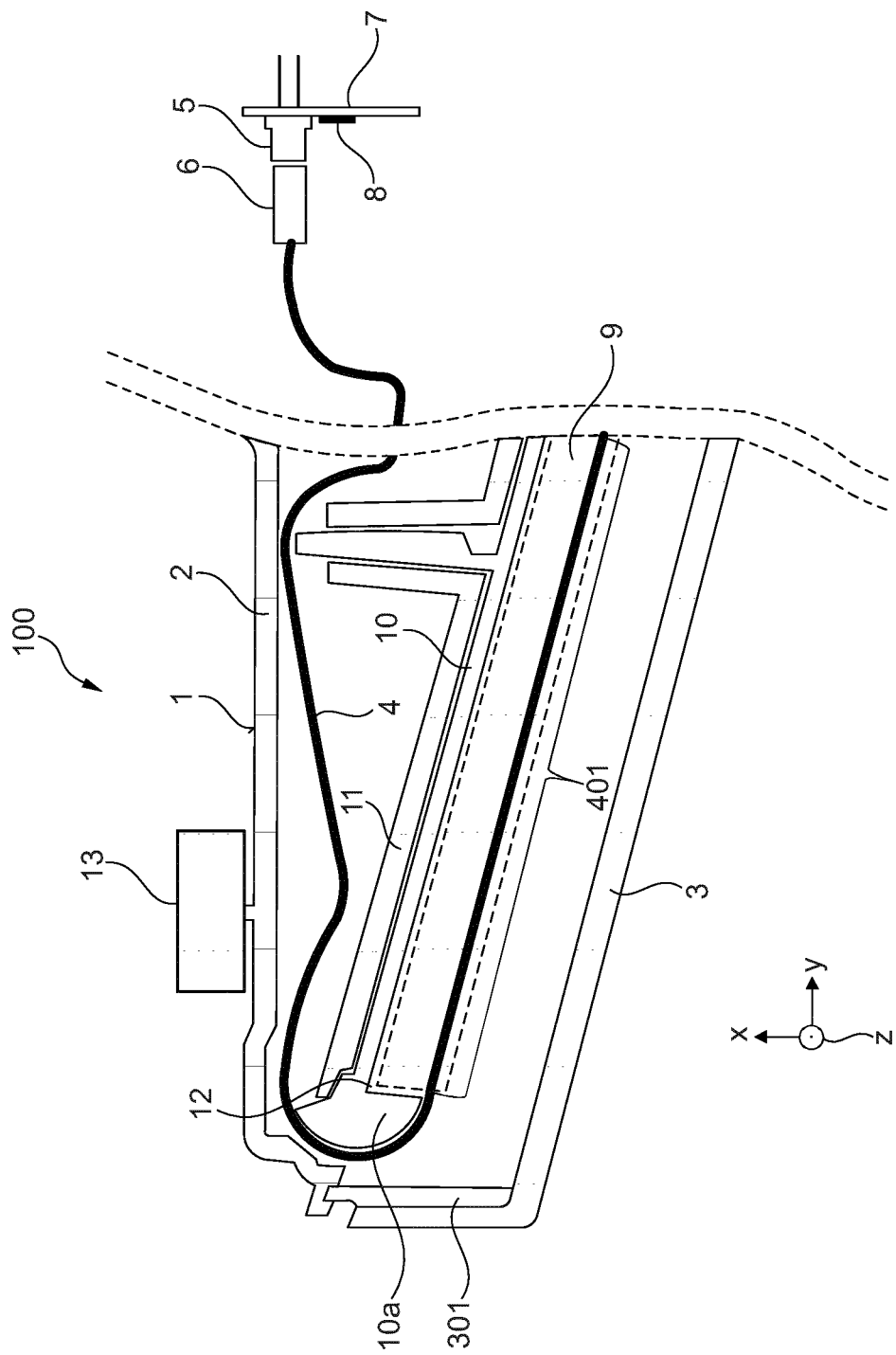
FIG. 1 shows a sectional view along a horizontal plane through one embodiment of a lighting device according to the invention in the form of a rear lamp.

In the following text, one embodiment of the invention will be described with reference to the left-hand rear lamp of a motor vehicle. The rear lamp contains multiple flexible light guides which form part of the taillight of the rear lamp. In this respect, FIG. 1 shows a schematic illustration of a section through the rear lamp along a horizontal plane which runs through a light guide fitted in the rear lamp. FIG. 1 indicates the spatial alignment of the rear lamp using a Cartesian coordinate system. In this case, the x axis corresponds to the longitudinal direction of the motor vehicle or its direction of forward travel, the y axis is the transverse direction of the motor vehicle from left to right, and the z axis is the vertical direction of the motor vehicle from bottom to top.

FIG. 1 reproduces a left-hand subregion of the rear lamp, with the rear lamp being denoted by reference sign 100. The rear lamp has a closed housing 1 which comprises a rear housing portion 2 and a light-permeable covering lens 3. A connecting portion 301, which connects the covering lens to the rear housing portion 2, is provided on the covering lens 3. The rear housing portion bears against the motor vehicle by way of a seal 13 running around the periphery. In the interior of the housing 1, among other things, multiple flexible light guides 4 are provided, with one of these light guides being illustrated in section and denoted by reference sign 4 in FIG. 1. The light guide comprises a bundle of a plurality of light guiding fibers which, in the embodiment described here, are glass fibers sheathed in a plastic. Optionally, the flexible light guide may also consist of fibers of another material.

At one end, the flexible light guide 4 comprises a fiber coupler 6, via which light is fed into the light guide by way of a lighting apparatus in the form of a red laser diode 5. The laser diode 5 in this case is fastened to a plate 7, on which a temperature sensor 8 is also provided. In order to protect the laser diode 5 against overheating, while it is operating the temperature is measured by the temperature sensor 8. If the temperature exceeds a certain threshold value, the laser diode is dimmed or turned off. A corresponding laser diode 5 is provided for each of the light guides fitted in the rear lamp for the purpose of feeding in light. Similarly, a fiber coupler 6 via which the light from the associated laser light source enters the light guide is provided for each light guide. Preferably, all the laser diodes are fitted on a shared plate and use the same temperature sensor for protection against overheating.

All of the laser diodes 5 fitted in the rear lamp, the corresponding fiber couplers 6 and the plate 7 with the temperature sensor 8 are arranged behind a stop 11 in the interior of the housing 2. The feeding in of light by the laser diodes is thus not visible through the covering lens 3. The red light from the laser diode 5, which is input coupled into the light guide 4 via the fiber coupler 6, is guided along the light guide in its longitudinal direction and in the process continuously exits the light guide along its entire circumference. This causes the light guide to be lit up red.

The light guide 4 is guided around the stop 11 at the left-hand end of the housing 1, for which use is made of a carrier 10 mechanically connected to the stop. The carrier 10 comprises a semicircular portion 10a which, along its circumference, contains a groove which receives a part of the light guide 4 that is guided from the rear side of the stop 11 toward the front region of the housing 1 next to the covering lens 3. From there, the light guide 4 extends to the right.

On the front side of the carrier 10 there is a depression, or cutout, 12 in which a fastening portion of a light-permeable profile 9 is received. The profile is indicated only schematically in FIG. 1 by way of a dashed outline and will be explained in more detail below with reference to other figures. The profile 9 makes it possible to fasten the light guide easily in the interior of the housing, it being ensured that light exits in the region of the profile owing to its light permeability. The light from the light guide 5 that is received in the profile can thus exit the rear lamp via the profile and the light-permeable covering lens 3. The light-permeable covering lens may be uncolored in this case and allow the majority of the exiting light to pass through. In other words, in a preferred variant, the covering lens is transparent. However, the covering lens may optionally also be colored, for example in red, in a manner corresponding to the color of the light output by the light guide 4.

Figure 2:
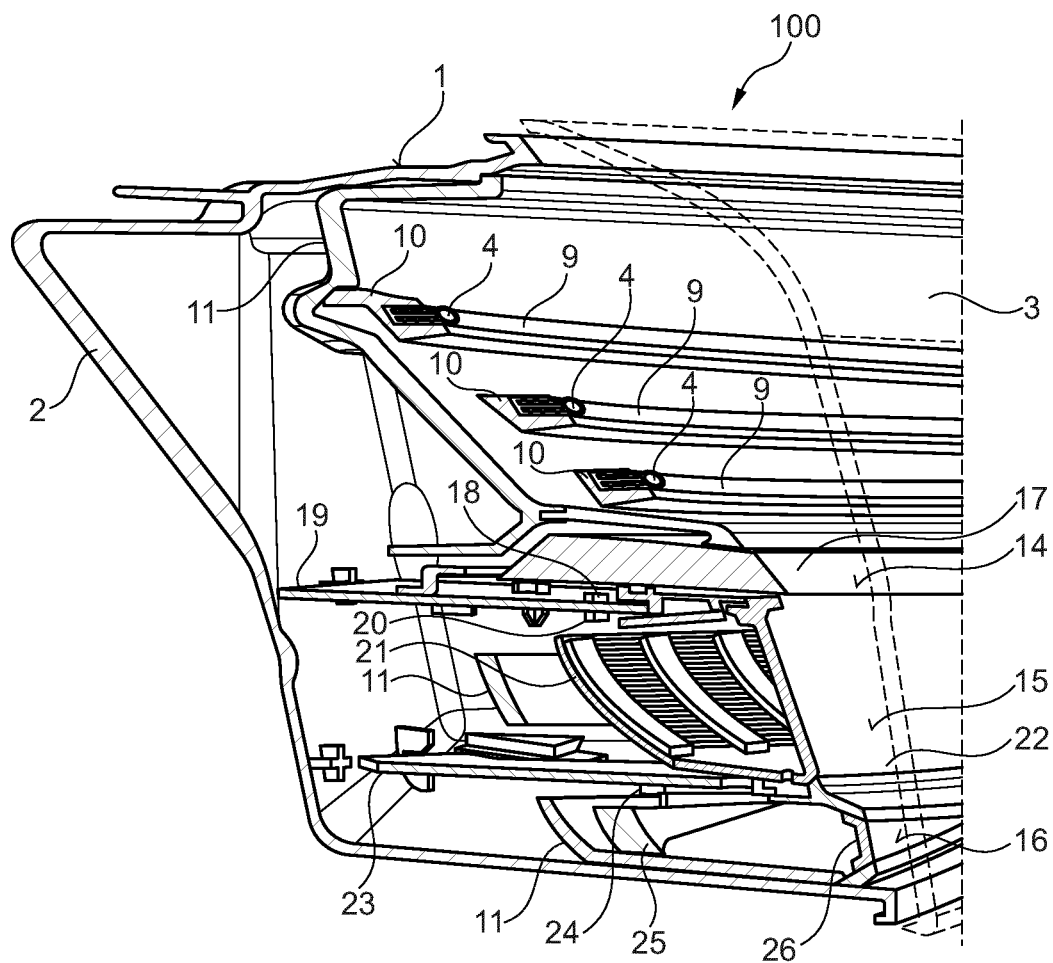
FIG. 2 shows a perspective sectional view of the rear lamp from FIG. 1.

FIG. 2 shows a perspective illustration of a section through the rear lamp of FIG. 1, with only components that are relevant for understanding the invention being denoted by reference signs and described below. The section is in a plane spanned by the x direction and the z direction of the coordinate system reproduced in FIG. 1. It can be seen in FIG. 2 that, in the interior of the rear lamp 100, three light guides 4 arranged one above another are provided and furthermore still other lighting units are also fitted. It can be seen especially clearly that the corresponding light guides 4 are received inside respective profiles 9 and a fastening portion of the respective profiles is positioned in a depression in a corresponding carrier 10, this being described in still more detail below. For reasons of clarity, in FIG. 2 reference signs for the depressions and for portions of the profile have been omitted. Corresponding reference signs are, however, present in other figures.

The stop 11, which not only is located in the region of the light guides 4 but also has portions and openings thereunder, through which components of the rear lamp extend, is visible in FIG. 2. According to FIG. 2, the rear lamp contains, in addition to the three light guides 4, the three further lighting units 14, 15 and 16. The lighting unit 14 is the direction indicator of the rear lamp. This lighting unit comprises multiple LEDs 18 which are arranged on the top side of a plate 19, only one of these LEDs being visible in FIG. 1. The LEDs radiate yellow light into a flat light guide 17 in the form of a thick-wall optical system which is known per se. During operation of the indicators, this light exits the front side of the thick-wall optical system and then exits the housing 1 of the rear lamp. This indicates the direction of travel selected by the driver by way of correspondingly flashing the LEDs 18.

Below the lighting unit 14 there is the lighting unit 15 constituting the brake light of the rear lamp, that is to say that the lighting unit 15 is activated when the driver engages the brake. The lighting unit 15 comprises a bent reflector 21 and a plurality of LEDs 20, in turn only one of these LEDs being visible in FIG. 2. The LEDs are arranged on the bottom side of the plate 19 and radiate red light downward onto the reflector 21, which deflects the light by way of an intermediate light lens 22 toward the covering lens 3 and thus into the exterior space of the motor vehicle. Below the lighting unit 15 there is a further lighting unit 16, which, together with the light guides 4, forms the taillight of the rear lamp 100. The lighting unit 16 comprises a plurality of LEDs 24, in turn only one of these LEDs being visible in FIG. 2. The LEDs 24 are arranged on the bottom side of the plate 23 and radiate red light downward to a reflector 25, which deflects the light by way of an intermediate light lens 26 toward the covering lens 16 and thus into the exterior area of the motor vehicle.

FIG. 3 shows a perspective illustration of a detail of the rear lamp of FIG. 1 and FIG. 2 in a right-hand region at a location where the light guides 4 are guided from the front side of the associated carriers 10 behind the stop 11 again. It can be seen in FIG. 3 in particular that the carriers 10 provided for the respective light guides also have, at their right-hand end, a semicircular portion 10a in which the corresponding light guide is guided around the carrier 10 to the rear side of the stop 11. The respective light guides 4 finally terminate behind the stop 11, that is to say that end of the respective light guides that is opposite the end with the fiber coupler 6 is located behind the stop. In a preferred embodiment, a detection unit is provided there to detect the light intensity of the exiting light. If the light intensity falls below a certain threshold value, it is assumed that the light from the corresponding laser diode has propagated undesirably, whereupon the laser diode is turned off by way of a controller in order to avoid damaging the eyes of a viewer owing to laser light exiting in uncontrolled fashion.

FIG. 4 shows a perspective illustration of a detail of a portion of the profile 9 with a light guide 4 received therein. As can be seen, the profile comprises a round receiving portion 901 in which the light guide is fixed. Preferably, this fixing is achieved by clamping the light guide in the receiving portion 901, it being possible alternatively or additionally also to adhesively bond the light guide in the receiving portion. Two flanges 902 and 902' adjoin the receiving portion 901, bear against one another and each have on their outer side three projections 903 in the form of elongate ribs extending parallel to one another in the longitudinal direction of the profile.

The profile 9 is a one-piece component of a resilient and light-permeable plastic, the light transmittance of the plastic preferably being 90% or more. The profile 9 is preferably elastic such that the light guide 4 received in the receiving portion 901 can be bent with a bending radius of 6 mm and possibly also less than that. Accordingly, the light guide 4 may also be guided inside the profile 9 in curved fashion, for this the carrier 10 with the depression 12 provided therein also being correspondingly curved. A portion of a curved guide of the light guide 4 along the profile 9 and the carrier 10 is shown by way of example in the perspective illustration of FIG. 5. As can be seen there, the carrier 10 in the detail illustrated has a curved form and, in its depression, contains the correspondingly shaped profile 9, which in turn receives the light guide (not visible in FIG. 5).

FIGS. 6 and 7 depict how the light guide 4 is fastened in the carrier 10 via the profile 9. In FIG. 6 and FIG. 7, the light guide 4 and the profile 9 are reproduced in cross section. According to FIG. 6, the profile, which is preferably produced by an extrusion process, after being manufactured is initially present in the form of a flat component comprising a recess which forms the receiving portion 901 after the profile is installed in the rear lamp. According to FIG. 6, the respective flanges 902 and 902' containing the channels 903 on the bottom side extend on the left and right of the recess.

To install the light guide 4 in the rear lamp 100, the light guide is first of all placed in the recess of the profile 9, as indicated by the arrow P1 in FIG. 6. Then, the two flanges 902 and 902' are folded upward, as indicated by the arrows P2 and P3. This is possible without problems owing to the resilience of the material of the profile 9. The profile 9 folded together in this way with the light guide 4 received therein is then pushed into the depression 12 in the carrier 10, as can be seen in FIG. 7 and indicated there by the arrow P4. After the profile has been pushed in, the two flanges 902, 902' press against opposite sides of the inner wall of the depression 12, with the result that the channels 903 bear against the inner wall. The channels have a form here which causes the flanges to latch on the inner wall of the depression, which has the effect of good retention of the profile 9 and thus of the light guide 4 on the carrier 10. Optionally, the outer sides of the flanges 902 and 902' can be provided with adhesive before the profile 9 is pushed into the depression 12 in the carrier 10, with the result that the profile is also retained in the depression by way of an adhesive bond.

The embodiment of the invention described above has a series of advantages. In particular, the fastening of a light guide in a lighting device for the exterior space of a motor vehicle is achieved in straightforward fashion. To that end, use is made of a suitable profile which consists of a light-permeable and resilient material and thus also allows curved guidance of the light guide inside the lighting device with a wide variety of different shapes. In the process, the light guide is fixed in a receiving portion of the profile and retained in a carrier inside the lighting device by way of corresponding flanges of the profile. Owing to the light permeability of the profile, it is always ensured that the light from the light guide can radiate outward through the covering lens. The light-permeable material of the profile also does not generate any additional scattering effects of the luminous light guide and thus does not distort the light pattern. Consequently, the light guide appears extremely precisely in the form of a thin line when the laser diode is activated.

The use of the light-permeable profile also causes the light guide to appear as a freely floating object, since the light-permeable profile owing to its small dimension cannot be seen, or is not visible, in the turned-on state or in the turned-off state of the laser diode. The profile geometry used also makes it possible to retain light guides with different diameters. The clamping force in the receiving portion of the profile is accordingly larger or smaller. However, it is not necessary to create a new profile for every diameter of a light guide, this increasing the flexibility of application. Provided that the light guide is retained in the receiving portion of the profile, it is protected against improper handling. Pulling, rotating, twisting and grasping of the light guide are ruled out in that case.

LIST OF REFERENCE SIGNS

100 Lighting device
1 Housing
2 Rear housing portion
3 Covering lens
301 Connecting portion
4 Light guide
401 Specific portion of the light guide
5 Laser diode
6 Fiber coupler
7 Board
8 Temperature sensor
9 Profile
901 Receiving portion
902, 902' Flange (Fastening portion)
903 Ribs
10 Carrier
10a Semicircular portion of the carrier
11 Stop
12 Depression
13 Seal
14 Direction indicator
15 Brake light
16 Taillight
17 Thick-wall optical system
18 LED
19 Board
20 LED
21 Reflector
22 Intermediate light lens
23 Board
24 LED
25 Reflector
26 Intermediate light lens
P1, P2, P3, P4 Arrows

The invention claimed is:

1. A lighting device for an exterior space of a motor vehicle, the lighting device comprising:
a housing with a light-permeable covering lens; and
at least one flexible light guide arranged at least partially in the housing, wherein:
a respective light guide contains at least one fiber which extends between two ends of the respective light guide in a longitudinal direction of the respective light guide,
a lighting apparatus is provided to feed in light at one end of the respective light guide and the light that is fed in is guided through the respective light guide along the longitudinal direction and continuously exits the respective light guide along an entire circumference of the respective light guide, at least some of the light radiation exits the lighting device through the covering lens, a specific portion of the respective light guide is retained in an interior of the housing in a carrier by a profile, the profile has a light-permeable receiving portion in which the specific portion is received and fixed, and a fastening portion which extends from the receiving portion into a depression in the carrier and is fixed in the depression, the fastening portion comprises two flanges which bear against opposite sides of an inner wall of the depression, each of the flanges comprises a plurality of projections that bear against the respective opposite side of the inner wall of the depression, a portion of a first one of the flanges adjacent to the receiving portion bears against a portion of a second one of the flanges adjacent to the receiving portion, and a space is maintained between the flanges within the depression at a distance from the receiving portion.

2. The lighting device according to claim 1, wherein the specific portion contains a region of the respective light guide that is visible through the covering lens when the lighting apparatus is on.

3. The lighting device according to claim 1, wherein the respective light guide is clamped and/or latched and/or adhesively bonded in the receiving portion of the profile.

4. The lighting device according to claim 1, wherein the profile is a one-piece component.

5. The lighting device according to claim 4, wherein the entire profile is made of a same material.

6. The lighting device according to claim 1, wherein the profile is made of plastic and is an extruded component.

7. The lighting device according to claim 6, wherein the plastic comprises PMMA.

8. The lighting device according to claim 1, wherein the receiving portion of the profile is made of a resilient material which enables a minimum bending radius of the specific portion of 100 mm or less.

9. The lighting device according to claim 1, wherein the entire profile is made of a resilient material which enables a minimum bending radius of the specific portion of 100 mm or less.

10. The lighting device according to claim 8, wherein the specific portion is guided in the profile in at least partially curved fashion.

11. The lighting device according to claim 8, wherein the receiving portion of the profile is a portion of the resilient material that is bent around at least part of a circumference of the respective light guide.

12. The lighting device according to claim 1, wherein the fastening portion of the profile is clamped and/or latched and/or adhesively bonded in the depression of the carrier.

13. The lighting device according to claim 1, wherein:
the receiving portion connects the flanges to one another.

14. The lighting device according to claim 13, wherein the flanges have a continuous form along the longitudinal direction of the respective light guide in the specific portion.

15. The lighting device according to claim 1, wherein the lighting apparatus comprises at least one LED and/or at least one laser light source for feeding red light into the at least one light guide.

16. The lighting device according to claim 1, wherein:
the carrier is arranged on an opaque stop, and
the lighting apparatus is located behind the stop.

17. The lighting device according to claim 16, wherein the at least one light guide forms at least part of a taillight of the motor vehicle when the lighting apparatus is turned on.

18. The lighting device according to claim 1, wherein the lighting device is a rear lamp.

19. A motor vehicle comprising the lighting device according to claim 1.

* * * * *